F. BABEK.
DERRICK.
APPLICATION FILED JUNE 9, 1920.
1,359,948.
Patented Nov. 23, 1920.
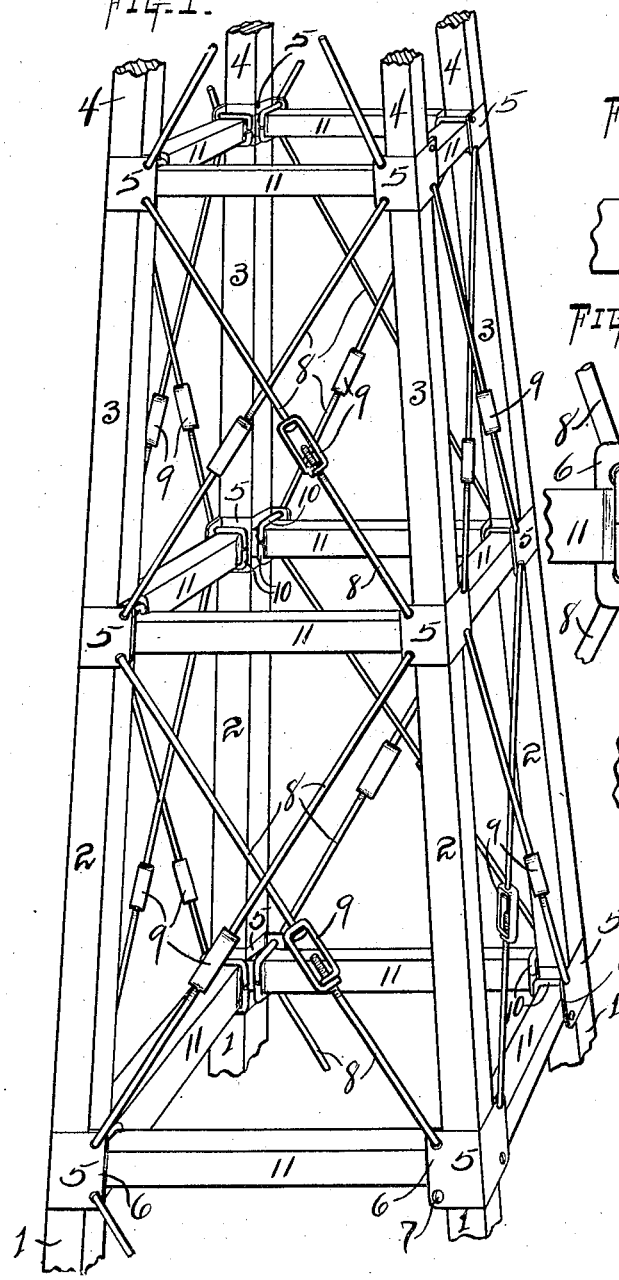
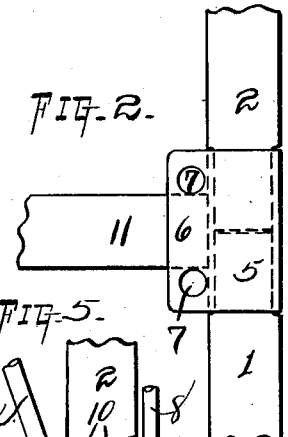
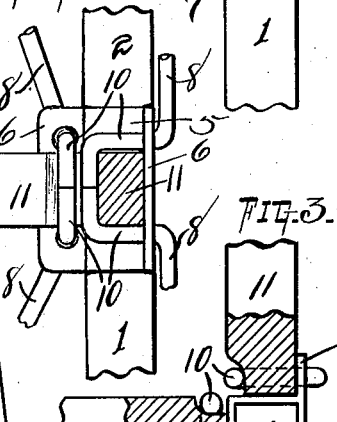
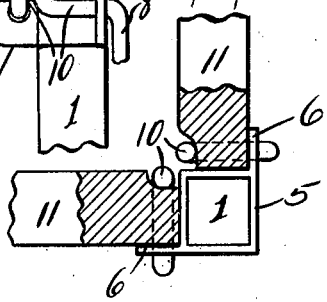
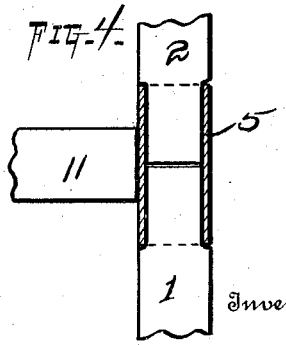
Inventor
FRANK BABEK.
By A. L. Jackson
Attorney

UNITED STATES PATENT OFFICE.

FRANK BABEK, OF FORT WORTH, TEXAS.

DERRICK.

1,359,948.     Specification of Letters Patent.     Patented Nov. 23, 1920.

Application filed June 9, 1920. Serial No. 387,611.

*To all whom it may concern:*

Be it known that I, FRANK BABEK, a citizen of the United States of America, residing at Fort Worth, in the county of Tarrant and State of Texas, have invented certain new and useful Improvements in Derricks, of which the following is a specification.

My invention relates to derricks for oil wells and the like, and more particularly to means for coupling the parts together and bracing the same; and the object is to provide a simple construction for building and mounting derricks at relatively small expense and by which the parts are easily and quickly and safely coupled together and to provide means for bracing the upright members rigidly against vibrations. Other objects and advantages will be fully explained in the following description and the invention will be more particularly pointed out in the claim.

Reference is had to the accompanying drawings which form a part of this application.

Figure 1 is a perspective view of a portion of a derrick constructed in accordance with my invention. Fig. 2 is an enlarged side elevation of the couplings, showing the position of the timbers relative to the coupling. Fig. 3 is an enlarged view, showing parts of the horizontal timbers in horizontal section and showing the end of one of the uprights. Fig. 4 is a vertical section of one of the couplings and showing the position of the timbers relative to the coupling. Fig. 5 is a detailed sectional view, showing the manner of making the shanks of the braces engage the cross bars.

Similar characters of reference are used to indicate the same parts throughout the several views.

The improved derrick is composed of several series of upright members or the derrick is built in sections and the sections are coupled together. Members 1 are coupled to members 2 and members 2 are coupled to members 3 and members 3 are coupled to members 4. The means for coupling the upright members together consist of metal couplings 5 which have flanges 6 and openings 7 are made through the flanges to receive the bracing rods. The bracing rods 8 consist of two members adjustably connected by turnbuckles 9 and the rods all have bent shanks 10 which are projected through openings of the flanges 6 and engage the cross-bars 11, shown particularly in Fig. 5. The couplings 5 and the cross-bars 11 are centrally positioned relative to each other and the ends of the uprights 1 meet at the vertical centers of the couplings 5. The object is to have one set of cross-braces 11 brace the ends of two sets of uprights 1. The diagonal braces 8 tighten the couplings 5 against the ends of the cross-braces 11, and by reason of the couplings being countersunk on the ends of the uprights 1, the diagonal braces 8 tighten the uprights 1 in the couplings 5 and the ends of the uprights bear against each other. The ends of the shanks 10 substantially inclose the ends of the cross-braces 11 against the flanges 6. It will be seen that all the parts coöperate in bracing the derrick when the turnbuckles 9 are tightened on the diagonal braces 8. The shanks 10 of the diagonal braces 8 position the ends of the cross-braces 11 centrally against the couplings 5.

What I claim, is,—

A derrick composed of sets of couplings vertically disposed and having horizontally projecting flanges, sets of uprights having their meeting ends received in said couplings at the vertical centers thereof, cross-bars abutting against said couplings and against said flanges, and diagonal braces bent at their ends and projecting through said flanges and bent about said cross-bars and binding said cross-bars against said flanges and against said couplings and binding the meeting ends of said uprights against each other.

In testimony whereof, I set my hand, this 3rd day of April, A. D. 1920.

FRANK BABEK.